United States Patent
Dyke et al.

(10) Patent No.: US 6,427,042 B1
(45) Date of Patent: Jul. 30, 2002

(54) OPTICAL FIBRE DUCTING SYSTEM

(75) Inventors: Peter John Dyke, Widdington; Michael Philip Dyer, Stansted; Mark James Parry, Ware, all of (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/339,423

(22) Filed: Jun. 24, 1999

(30) Foreign Application Priority Data

Apr. 22, 1999 (GB) ............................................ 9909302

(51) Int. Cl.[7] ............................................. G02B 6/255
(52) U.S. Cl. ....................................................... 385/100
(58) Field of Search ......................................... 385/100

(56) References Cited

U.S. PATENT DOCUMENTS 5,363,432 A * 11/1994 Martin et al. ............ 379/90.01
5,696,864 A * 12/1997 Smith et al. ................ 385/134

* cited by examiner

*Primary Examiner*—Frank G. Font
*Assistant Examiner*—Andrew H. Lee

(74) *Attorney, Agent, or Firm*—Lee, Mann, Smith, McWilliams, Sweeney & Ohlson

(57) ABSTRACT

An apparatus for use in a optical fiber ducting system, the apparatus including
  a housing;
  a first aperture in the housing, the first aperture being arranged to receive a multi-bore optical fiber duct including at least two bores;
  at least two further apertures in the housing, the further apertures each being arranged to receive a respective optical fiber duct; and
  at least one connection means for connection of an individual bore of the multi-bore duct to at least one of the respective fiber ducts.

A method of provisioning for a telecommunications service via optical fiber to customers' premises, the method including;
  a) installing a first optical fiber tube between a main distribution site (MDS) and a first-customer proximity site (CPS1) external to customer premises,
  b) installing a first tube extension between the first tube at the CPS1 and the first customer's premises,
  c) installing an optical fiber along the first tube and the first tube extension, and
  d) connecting the fiber at the MDS to make available the telecommunication service for the first customer.

11 Claims, 5 Drawing Sheets

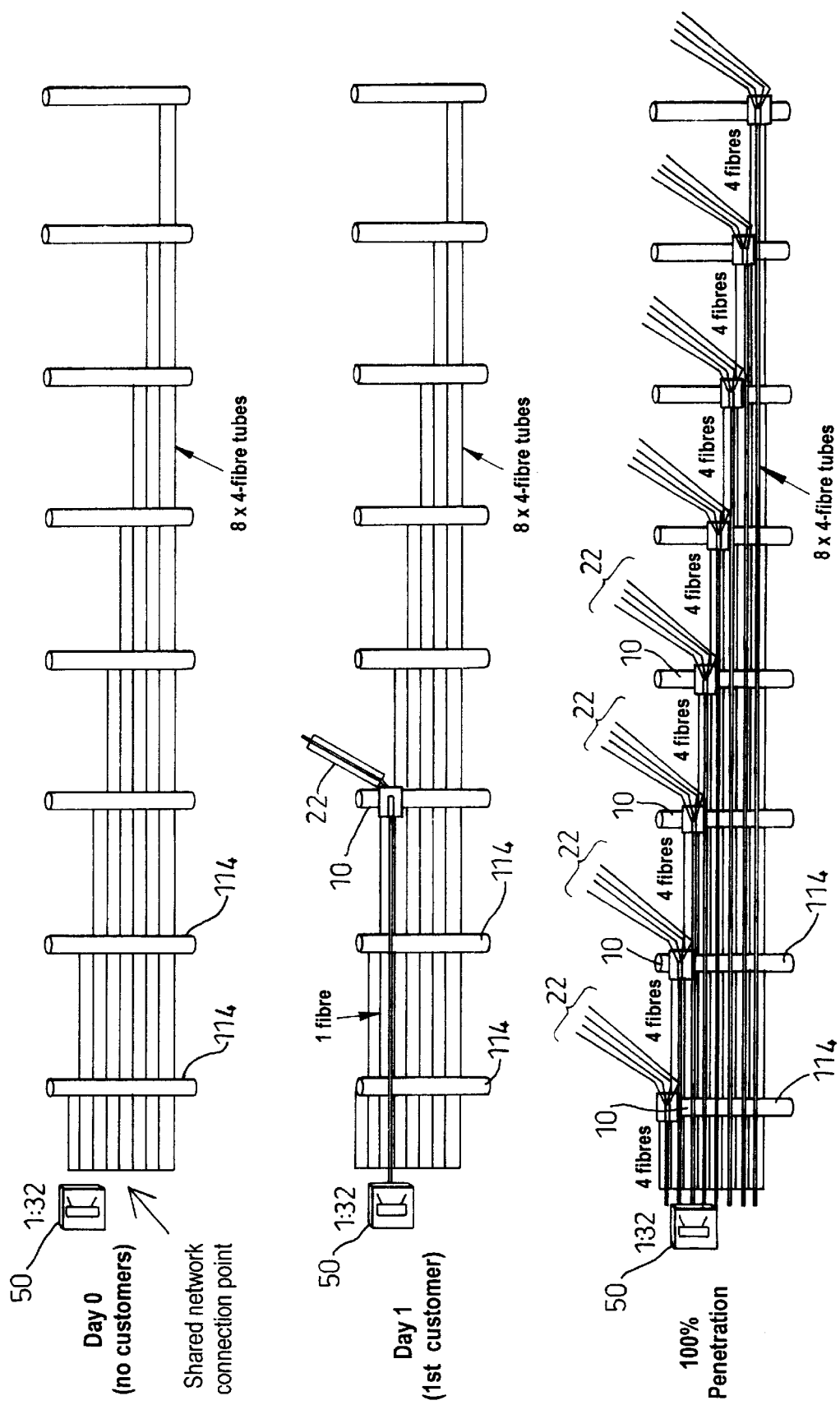

OPTICAL FIBRE DUCTING SYSTEM

The present invention relates to a method and an apparatus for providing a telecommunication service via optical fibre, and in particular to a method and an apparatus that may be used to provide a telecommunication service to customer premises cost-effectively at low penetrations using blown optical fibre.

BACKGROUND TO THE INVENTION

For many years there has been much interest in the telecoms industry in FTTH/SOHO (Fibre to the Home/Small Office/Home Office), as the alternate method of providing high bandwidth connections to customers. The majority of telecommunications operators have conducted field trials to establish the most appropriate optical technology to suit their requirements, and have also collaborated to determine specifications for potential products.

FIG. 1 shows a conventional method for distributing optical fibre cables to customers on a PON (Passive Optical Network) in the form of an overhead distribution network (110), where the end distribution fibre cables (sometimes known as lateral cables)(112c) are supported on poles (114). Multi fibre cable (112a) extends from the OLT (Optical Line Terminator) located in a central office via a FDI (Feeder or Fibre Distribution Interface), containing optical splitters, to the main distribution area. The network (110) is extended across the main distribution area using collector cables (112b) and connected by splices at a main splice box (50) to the lateral cables(112c).

At each pole (114) where there is a requirement for a connection to a customer premises (a customer 'drop') a fibre closure (or cable entry box) (116) is installed. This allows the lateral fibre cables (112c) to be accessed so that a connection may be made to the relevant fibre drop cable (118) which connects the customer to the distribution network. Such a connection may consist of one or more fibres connected to an ONU (Optical Network Unit). The ONU is in turn connected to the apparatus requiring the broadband overlay services eg. a television (132) or a computer (134). Unused lateral cable ends may simply be blanked-off (117).

FIG. 2 shows in more detail the connection from the street distribution cable (112c) to the customer's premises, in this instance a home. When connecting a fibre drop (118) to cables (112c), the latter is normally 'broken into' through the use of a cable entry box (120). The optical fibres to be 'dropped' are separated from the main cable and cut and then spliced on to a tail cable (122). The tail cable (122) typically extends from the cable entry box to the splice box (124), which may also be pole mounted. In some instances the cable entry box is combined with the splice box.

When a new customer requires a drop, the fibre drop cable (118) is connected to the fibre distribution network at the splice box (124) as shown in FIG. 3. An individual splice (128) is required for connecting each fibre drop cable to the respective fibre (119) of the tail cable. Seals (126) and blanking pieces (130) for unused fibre drop cable entry holes to the splice box, together with clamps (not shown) are used to ensure that the splice box is sealed from environmental conditions.

Connections to the network are normally made on a customer by customer basis. Splicing fibre cable is time consuming and requires a high craft skill base and is therefore relatively expensive. It is therefore expensive to provide the extensive network infrastructure over large areas so that individual customers may be easily connected to a local cable when required, e.g. providing the basic network to the street distribution level. Equally, connecting the customer's drop cable to the network requires a considerable amount of labour that also results in a high per-line cost. The costs are particularly significant at low customer penetrations, where the high upfront cost of installing the complete network infrastructure may only be shared across a few customers.

It is an object of the present invention to address at least one of the above-mentioned problems of the prior art. In particular, it would be desirable to address the problems associated with the high cost of the infrastructure and the time taken to connect customers to the network due to, for example, splicing at poles.

SUMMARY OF THE INVENTION

In one aspect, the present invention provides a method of provisioning for a telecommunications service via optical fibre to customers' premises, the method comprising;

a) installing a first optical fibre tube between a main distribution site (MDS) and a first-customer proximity site (CPS1) external to customer premises, b) installing a first tube extension between the first tube at the CPS1 and the first customer's premises, c) installing an optical fibre along the first tube and the first tube extension, and d) connecting the fibre at the MDS to make available the telecommunication service for the first customer.

Preferably, the installing of the fibre is selected from the group of blowing, pushing and pulling said fibre.

In another aspect, the present invention provides provisioning for a telecommunications service by the method of claim 4 or claim 5.

Preferably said first optical fibre tube is a multi bore tube, and said optical fibre is installed along a single bore of said multi bore tube.

The fibre connection at the MDS may be a splice.

Preferably, a second tube extension is installed, coupling between a further bore of the first tube and a second customer's premises, optical fibre is installed along the second bore and the second tube extension, and the fibre is connected at the MDS to make available the telecommunications service for the second customer.

Preferably, a second multi bore optical fibre tube is installed between a MDS and a further customer proximity site (CPS2) external to customer premises, a further tube extension is installed coupled between a bore of the second tube at the CPS2 and a further customer's premises, an optical fibre is installed along the bore of the second tube and the further tube extension, and the fibre is connected at the MDS to make available the telecommunications service for the further customer.

In another aspect, the present invention provides an apparatus for use in a optical fibre ducting system, said apparatus comprising a housing;

a first aperture in said housing, said first aperture being arranged to receive a multi-bore optical fibre duct comprising at least two bores;

at least two further apertures in said housing, said further apertures each being arranged to receive a respective optical fibre duct; and at least one connection means for connection of an individual bore of said multi-bore duct to at least one of said respective fibre ducts.

This connecting apparatus removes the need to splice adjacent to the customer premises (eg. at the pole top), hence reducing the number of splice required and resulting in a save in costs.

Preferably, said apparatus further comprises at least one closure means, said closure means being arranged to be removably fitted to said housing such that when located on said housing said closure means seals one of said apertures for prevention of ingress of undesired substances into the housing.

Preferably, the apparatus further comprises at least one clamp for securely locating at least one of the said ducts to said housing.

Other aspects and features of the present invention will become apparent to those ordinarily skilled in the art upon review of the following description of specific embodiments of the invention in conjunction with the accompanying drawings.

BRIEF DESCRIPTION OF THE DRAWINGS

There now follows a brief description of the accompanying drawings in which:

FIG. 5 shows a network including overhead cabling deployed in accordance with the present invention.

DETAILED DESCRIPTION OF PREFERRED EMBODIMENTS

Figure 4:
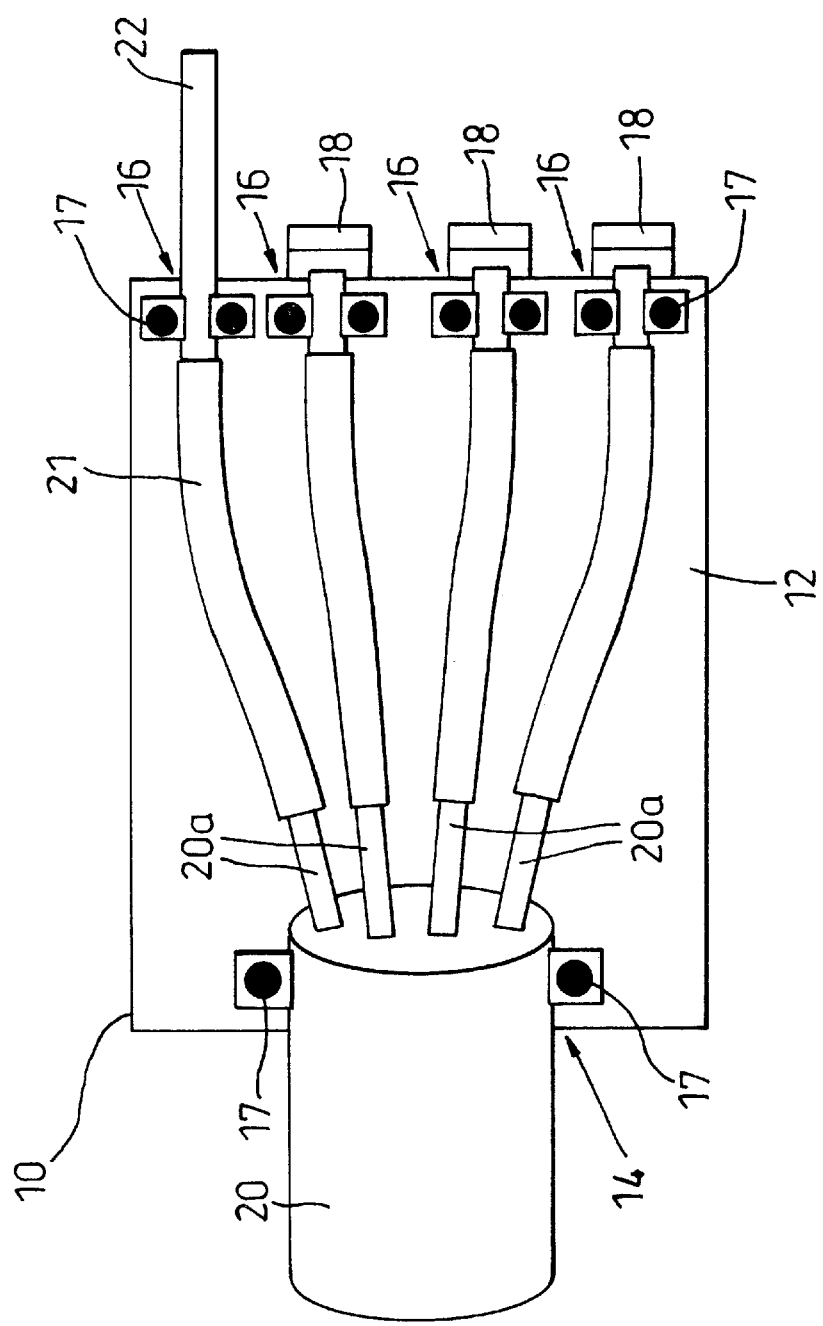
FIG. 4 shows a connection apparatus in accordance with an embodiment of the present invention.

A connecting apparatus (10) is shown in FIG. 4 to comprise a housing (12) with an aperture (14) to receive a street fibre mini-duct (20), and further apertures (16) to receive the customer fibre drop duct (22). Unused apertures may be sealed by blanking pieces (18) acting as closure means. The ducts may be connected to the housing via a push fit seal through the aperture, and/or by integral clamps (17). Individual bores or tubes (20a) from the street fibre mini-duct (20) may hence be easily connected (21) to the customer fibre drop duct or tube (which in turn is connected to the customer premises) so as to effectively form a continuous tube leading from the customer premises through the customer fibre drop duct and the bore of the street fibre mini-duct to a higher point (e.g. corresponding to the main distribution splice box shown in FIG. 1) on the network.

Figure 1:
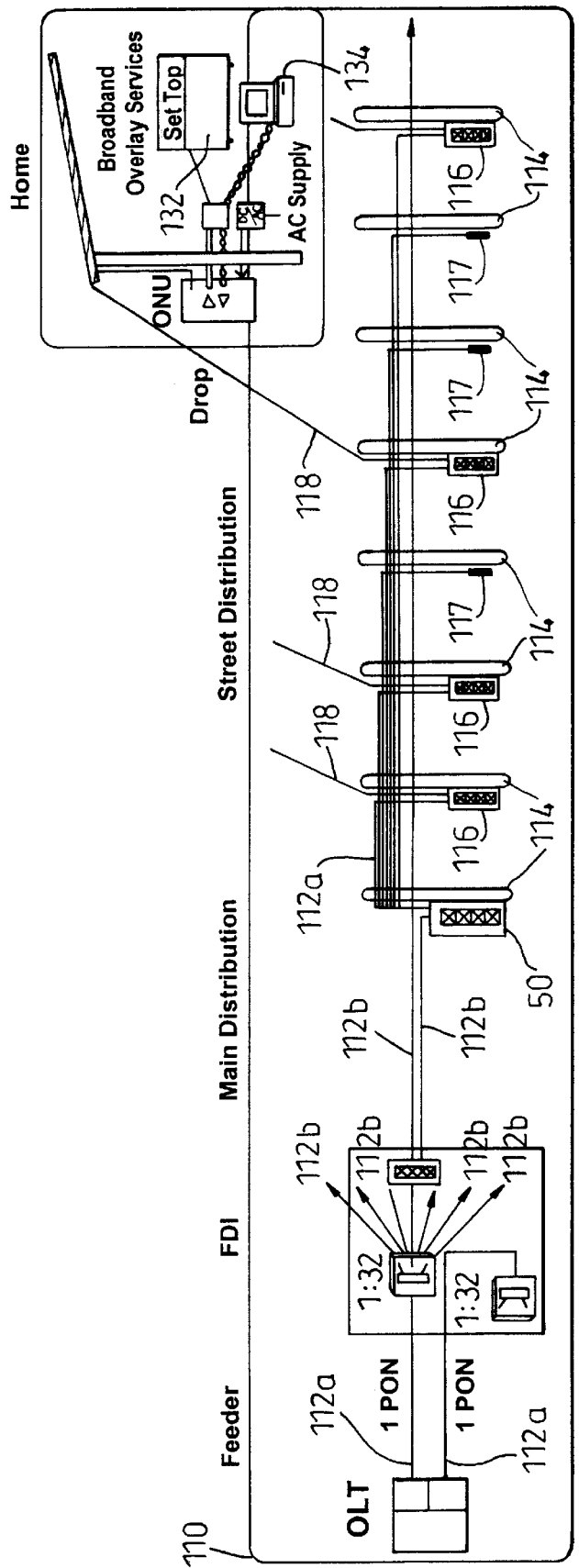
FIG. 1 shows a typical distribution network (prior art)
Figure 2:
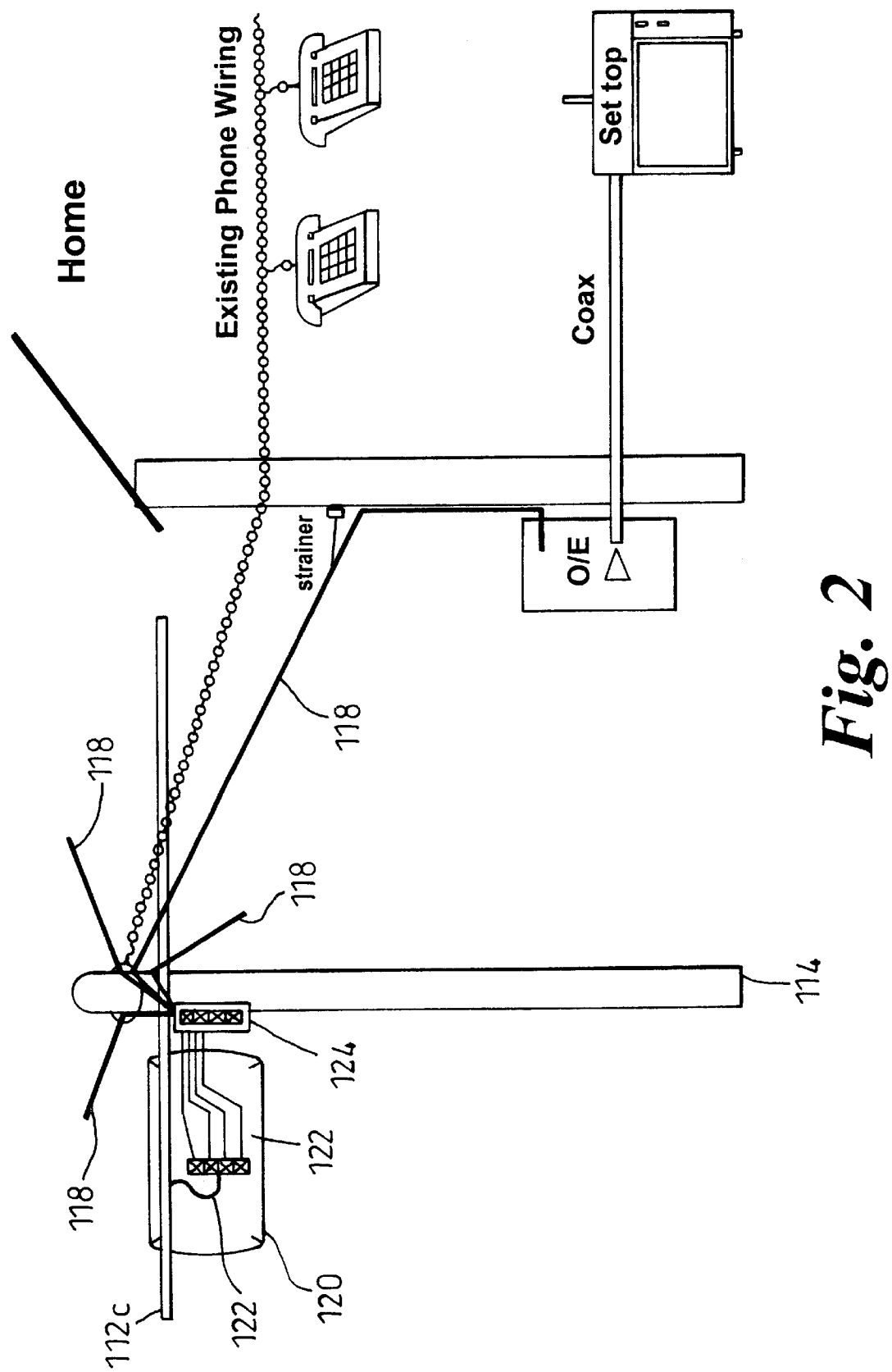
FIG. 2 shows a typical connection from the distribution network to a customers premises (prior art)
Figure 3:
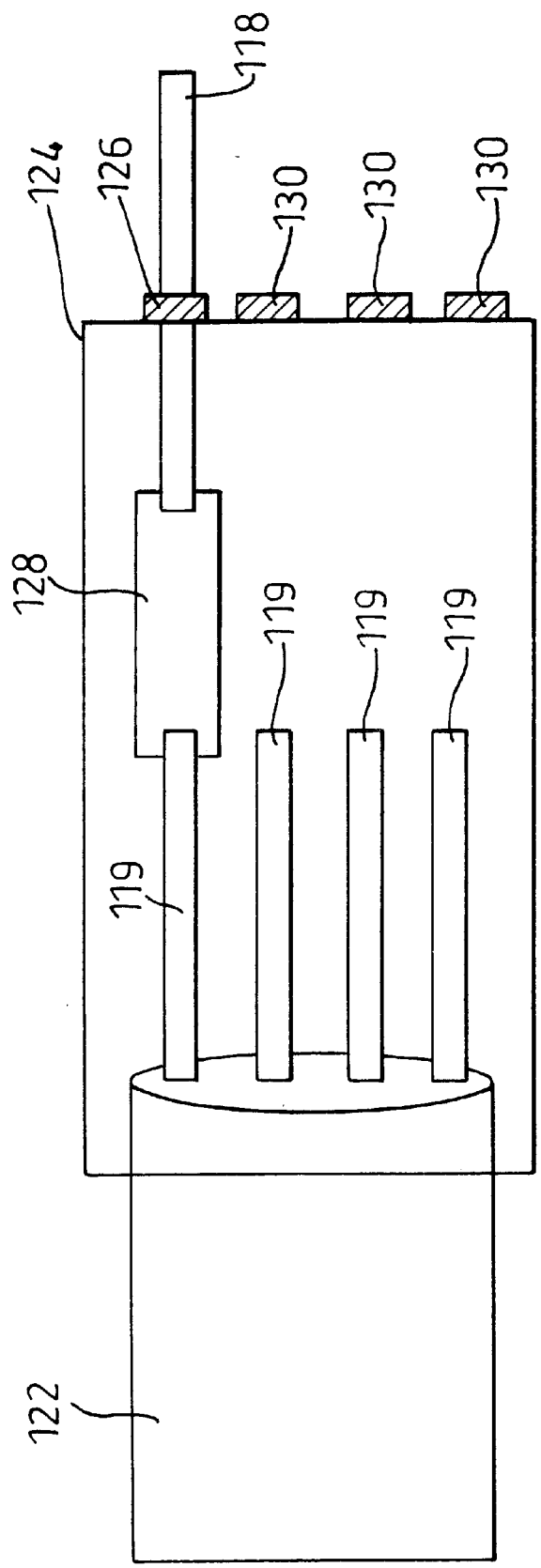
FIG. 3 shows a typical splice box from FIG. 2 (prior art)

Thus a single (or more) optical fibre may be blown or drawn directly from the customer premises to the higher network point. In use this removes the requirement for a splice and splice box per pole as indicated in FIGS. 1 to 3, and hence the higher costs associated with that splice.

FIG. 5 illustrates an example access network where the connection apparatus shown in FIG. 4 is utilised in conjunction with overhead cabling to deploy optical fibre to customers. In this example, there are four customers served by each pole. The diagram indicates the successive states from day zero (when no customers are connected to the network), to day one (when the first customers are connected to the hetwork), to 100% penetration (when all possible customers are connected to the network).

On day zero, the following is installed:

(a) a fibre feeder from the exchange (not shown) down to the shared network connection point (50) e.g. to the main distribution site at end of a street serving 32 homes, (b) at this point a splitter (e.g. 1:32) is installed for deployment of the PON (Passive Optical Network), (c) tubes (e.g. street fibre mini-ducts containing multiple bores) are then laid along the pole route in readiness for customer premises requiring optical fibre connections.

On day one the following is installed for the first customer:

(a) a connecting apparatus (10) is attached to the pole (DP, Drop Point) serving the customer's drop, (b) the four fibre tube from the shared network connection point is attached to the apparatus, (c) an individual tube fibre drop is connected to the apparatus and is laid from the DP to the customer's premises, (d) a fibre connection is then made to the customer's premises. This may be achieved by blowing a fibre or by drawing/pushing a fibre cable directly from the customer premises to the shared network connection point via the effectively continuous tube running from the customer premises to the connection point.

For the second and subsequent customers, the procedure for day one is repeated with connecting apparatus being installed as required. Clearly, customers with adjacent premises/premises located near to each other may share a connecting apparatus. At 100% penetration, the network is fully equipped.

Alternatively, if required some or all of the connecting apparatus (10) could be installed on day zero.

Hence the network infrastructure may be installed at a relatively cheap cost down to street distrbution level, as only a network of ducts/tubes need be installed at the street distribution level, i.e. on day zero it is much cheaper just to install tubes for blown fibre in terms of both equipment and labour costs, rather than complete fibre cables which will remain largely unused.

Further, in conventional solutions the distribution splice box needs to manage the unused fibres in the street fibre cables. In the present invention, fibres are installed only as required, so there are no spare fibres to manage.

Although the above example implementation is described in relation to an overhead plant, the invention may be applied in situations where the plant is underground. In this case the full complement of tubes and apparatus may be installed at Day 1. Fibres could then still be installed as required.

Although blown fibre is described in the above preferred embodiment as the medium for installation in the ducts, it will of course be appreciated that the use of other media, particularly cabled fibre, is not precluded. This could use conventional installation techniques such as pulling or pushing.

What is claimed is:

1. A method of provisioning for a telecommunications service via optical fibre to customers' premises, the method comprising;

a) installing a first optical fibre tube between a main distribution site (MDS) and a first-customer proximity site (CPS1) external to customer premises, b) installing a first tube extension between the first tube at the CPS1 and the first customer's premises, c) installing an optical fibre along the first tube and the first tube extension, and d) connecting the fibre at the MDS to make available the telecommunication service for the first customer.

2. A method of provisioning as claimed in claim 1, wherein installing of the fibre is selected from the group of blowing, pushing and pulling said fibre.

3. Provisioning for a telecommunications service by the method of claim 1.

4. A telecommunications service provided by the method or provisioning of claim 1, wherein said first optical fibre tube is a multi bore tube, and said optical fibre is installed along a single bore of said multi bore tube.

5. A telecommunications service provided by the method or provisioning of claim 1, wherein the fibre connection at the MDS is a splice.

6. A telecommunications service provided by the method or provisioning of claim 1, wherein a second tube extension is installed, coupling between a further bore of the first tube and a second customer's premises, optical fibre is installed along the second bore and the second blow tube extension, and the fibre is connected at the MDS to make available the telecommunications service for the second customer.

7. A telecommunications service provided by the method of claim 1, wherein a second optical fibre tube is installed between a MDS and a further customer proximity site (CPS2) external to customer premises, a further tube extension is installed coupled between a bore of the second tube at the CPS2 and a further customer's premises, an optical fibre is installed along the bore of the second tube and the further tube extension, and the fibre is connected at the MDS to make available the telecommunications service for the further customer.

8. A method according to claim 7 wherein at least one of said first and second optical fibre tubes is a multi bore tube, and said optical fibre is installed along a single bore of said at least one of said first and second optical fibre tubes.

9. A method according to claim 1 wherein the step of installing an optical fiber comprises the step of:

coupling said first and second tubes by means of an apparatus comprising a housing;

a first aperture in said housing, said first aperture being arranged to receive a multi-bore optical fibre duct comprising at least two bores;

at least two further apertures in said housing, said further apertures each being arranged to receive a respective optical fibre duct; and at least one connection means for connection of an individual bore of said multi-bore duct to at least one of said respective fibre ducts.

10. A method according to claim 9 wherein the apparatus further comprises at least one closure means, said closure means being arranged to be removably fitted to said housing such that when located on said housing said closure means seals one of said aperture for prevention of ingress of undesired substances into the housing.

11. A method according to claim 9 wherein the apparatus further comprises at least one clamp for securely locating at least one of the said ducts to said housing.

\* \* \* \* \*